Aug. 31, 1965 L. E. JOHNSON 3,203,177
BRAKE AND REVERSE DRIVE FOR GAS TURBINE ENGINES
Filed Aug. 19, 1963
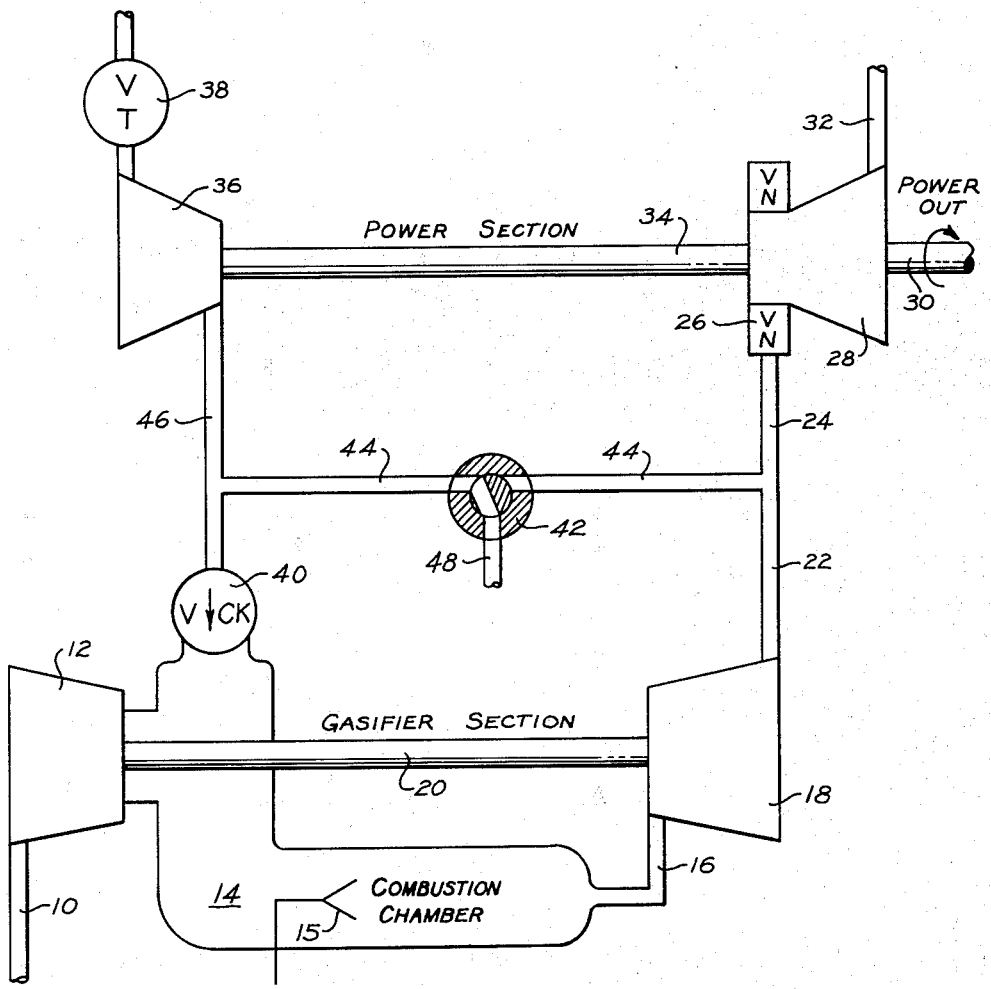
Fig_1_
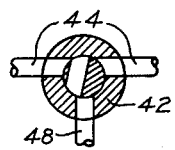 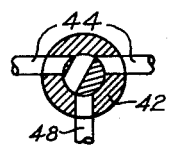 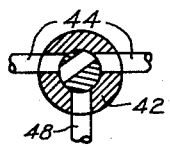 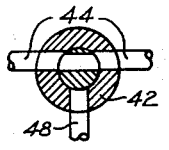
Fig_2_  Fig_3_  Fig_4_  Fig_5_
INVENTOR.
LLOYD E. JOHNSON
BY
Fryer and Tjensvold
ATTORNEYS

# United States Patent Office 3,203,177
Patented Aug. 31, 1965

3,203,177
BRAKE AND REVERSE DRIVE FOR GAS
TURBINE ENGINES
Lloyd E. Johnson, East Peoria, Ill., assignor to Caterpillar Tractor Co., Peoria, Ill., a corporation of California
Filed Aug. 19, 1963, Ser. No. 302,908
3 Claims. (Cl. 60—39.16)

This invention relates to gas turbine engines and particularly to braking and reversing means therefor.

Dynamic braking in the form of electrical or fluid retarders includes costly and separate components and requires special devices for dissipating heat of absorbed energy, which is wasted.

The present invention contemplates the use of gas turbine powered vehicles with braking and reversing means included as a part of a power unit.

It is the object of the invention to provide a gas turbine unit with an auxiliary compressor, usable alternately as a turbine, in a manner to provide an infinite range of braking as well as reversal of drive direction in which absorbed energy is gainfully utilized.

Further and more specific objects of the invention and the manner in which it is carried into practice are made apparent in the following specification wherein reference is made to the accompanying drawing.

In the drawing:

FIG. 1 is a schematic view of a gas turbine engine embodying the present invention;

FIGS. 2 to 5, inclusive, are schematic views of a valve shown in FIG. 1 illustrating different positions thereof used in the braking and reverse operation of the engine.

In the engine illustrated in FIG. 1, atmospheric air enters through an inlet 10 to a compressor 12 and the compressed air is exhausted into a chamber 14 to mix with fuel entering through a nozzle represented at 15 where it is ignited to produce expansion and power. The expanded gases enter a passage 16 and turbine 18 on a shaft 20 which is common to the turbine and the compressor 12 for driving the compressor. Gases under pressure from the gasifier section described are directed through passages 22 and 24 to a variable nozzle 26 of a power turbine 28 which drives an output shaft 30 and are exhausted to atmosphere at 32. The variable nozzle represented at 26 is of known design for varying the direction of flow of gases into the power turbine so that it may be driven with variable force either in a forward or reverse direction. A continuation of shaft 30 shown at 34 is connected with and drives an auxiliary compressor 36 of known design which is capable of operation as a turbine in response to reversing the direction of gas flowing through it. Operation of the auxiliary compressor 36 is responsive to and controlled by a throttle valve 38, a check valve 40 and a three-way valve 42, the function of which will presently be described in detail.

In operation, under normal forward drive of the power output shaft 30, the three-way valve 42 is adjusted to the position shown in FIG. 1 to close communication through a bypass 44 which communicates between the passage 22 and a passage 46 which in turn communicates between the auxiliary compressor and the combustion chamber 14 through the check valve 40. Thus all gas from the gasifier section is directed through the power turbine 28 for driving the output shaft. At this time, the variable throttle 38 is closed so that even though the auxiliary compressor 36 is rotating no substantial flow is present in channel 46 which leads to the check valve 40 and three-way valve 42, the latter being in a position to vent these passages through an exhaust opening 48. Thus pressure in line 46 is below that in the combustion chamber 14 and the check valve 40 is closed.

A limited compressor braking or retarding in forward drive, as would be used for example in regulating the speed of a vehicle rolling down hill, is accomplished by adjusting the variable nozzle 26 to a position where it does not impart a driving torque in either direction to the power turbine 28 and developing braking power in the auxiliary compressor 36. To accomplish this, fuel to the burner is reduced, the variable throttle 38 is gradually opened and three-way valve 42 is gradually moved from the position of FIG. 1 through the position of FIG. 2 and for full retarding effect to the position of FIG. 3 where exhaust from the compressor 36 to the atmosphere is cut off. Thus the compressor 36 absorbs energy from the output shaft and pressure in line 46 opens the check valve 40 directing additional air to the gasifier section to help drive turbine 18 and the additional flow passes through the power turbine 28. However, since the combustion chamber is in a low fuel or off position and the variable nozzle is set for zero torque from the power turbine, the speed of the output shaft is retarded by the power needed to drive the auxiliary compressor. The degree of retarding torque applied to the output shaft depends upon the degree of opening of the variable throttle and adjustment of the three-way valve until the throttle is completely open and the three-way valve completely closes exhaust to atmosphere as in FIG. 3. One advantage in the retarding system described above is that the energy in air flowing from compressor 36 through the turbine 18 enables a significant reduction or even complete shut off of fuel to the combustion chamber while still maintaining rotation of the gasifier section at sufficient speed to permit instantaneous return to operation in the normal power developing mode. During such retarding or braking action the braking energy is utilized to substantially reduce the amount of fuel the engine would otherwise consume to maintain unloaded operation in readiness for subsequent power demands. Thus, a substantial reduction in over-all fuel consumption could be made in an application utilizing the braking and retarding characteristics of a gas turbine engine with this design.

Still greater braking torque can be applied by adjusting the variable nozzle 26 to effect reverse drive of the power turbine 28. Were the three-way valve to be left in the position of FIG. 3, the auxiliary compressor 36 would be acting in parallel with the compressor 12. However the valve 42 can be further adjusted through the position of FIG. 4 or to the position of FIG. 5 and the rate of fuel delivery to the combustion chamber 14 increased for such amount of braking torque as is desired. If the speed of the power section is so low that the auxiliary compressor cannot develop as high a pressure as produced by the gasifier section in channel 22 with valve 42 adjusted to the position of FIG. 4 or FIG. 5, flow will reverse through lines 44 and 46 to the auxiliary compressor 36 which then acts as a turbine developing further reverse drive torque on the shaft 34 and output shaft 30. Under these conditions the check valve 40 will be closed as pressure in the line 46 is lower than that in the combustion chamber 14 since there is a pressure drop in the gas flow through the compressor turbine 18. Thus reverse or braking torque is being applied to the output shaft both by the power turbine 28 and the auxiliary compressor 36 acting as a turbine. This torque may be increased or decreased depending upon the amount of fuel to the burner and the setting of the valve 42.

Reverse operation of the output shaft 30 is accomplished in the same manner as braking with reverse torque developed as described above with the valve 42 set as shown in FIG. 5 to deliver as much pressure as possible to the auxiliary unit 36. The throttle valve 38 is of course fully open under these conditions.

When the power output shaft is operating in reverse as above described, braking is accomplished by reverting to the forward drive conditions previously described with the valve 42 positioned as in FIG. 1, the variable throttle closed and the variable nozzle of the power turbine 28 adjusted to its forward drive position.

I claim:

1. In a gas turbine engine having a compressor and compressor turbine on a common shaft and a combustion chamber between the compressor and turbine, a power turbine, a power shaft driven thereby, an auxiliary compressor driven by said power shaft, a first passage for gas between said compressor turbine and said power turbine, a variable nozzle between said passage and the power turbine, a second passage for gas between said auxiliary compressor and said combustion chamber, a check valve to admit gas from the auxiliary compressor to the combustion chamber, a bypass between the first passage upstream of the variable nozzle and the second passage upstream of said check valve, and a three-way valve in said bypass to close the bypass and vent the auxiliary compressor or close the vent and open the bypass.

2. The combination of claim 1 in which the auxiliary compressor acts as a turbine when gas flows through it in reverse direction and a variable throttle associated therewith.

3. The combination of claim 1 with the variable nozzle positionable to develop forward, zero or reverse torque to the power turbine.

References Cited by the Examiner

UNITED STATES PATENTS

| | | | |
|---|---|---|---|
| 2,613,500 | 10/52 | Lysholm | 60—39.27 |
| 2,621,475 | 12/52 | Loy | 60—39.17 |
| 2,625,789 | 1/53 | Starkey | 60—39.16 |
| 2,742,760 | 4/56 | Hodge | 60—39.16 |
| 3,133,416 | 5/64 | Mock | 60—39.25 |

FOREIGN PATENTS 627,960   8/49   Great Britain.

SAMUEL LEVINE, *Primary Examiner.*